US008788652B2

(12) United States Patent
Ramanath et al.

(10) Patent No.: US 8,788,652 B2
(45) Date of Patent: Jul. 22, 2014

(54) REAL WORLD NETWORK TESTING COMBINING LOWER LAYER NETWORK TESTS, APPLICATION LAYER TESTS AND INTERDEPENDENT INTERACTIONS

(75) Inventors: Avinash Ramanath, Westlake Village, CA (US); Yossi Maish, West Hills, CA (US)

(73) Assignee: Ixia, Calabasas, CA (US)

( * ) Notice: Subject to any disclaimer, the term of this patent is extended or adjusted under 35 U.S.C. 154(b) by 971 days.

(21) Appl. No.: 12/510,163

(22) Filed: Jul. 27, 2009

(65) Prior Publication Data

US 2011/0022700 A1 Jan. 27, 2011

(51) Int. Cl.
*G06F 15/173* (2006.01)
*G06F 15/16* (2006.01)
*H04L 12/26* (2006.01)
*G06F 3/0481* (2013.01)

(52) U.S. Cl.
CPC .............. *H04L 43/50* (2013.01); *G06F 3/0481* (2013.01); *G06F 2203/04803* (2013.01); *H04L 12/2697* (2013.01)
USPC ............................ 709/224; 709/203; 709/232

(58) Field of Classification Search
CPC ............ G06F 11/2268; G06F 11/2273; G06F 11/263; G06F 11/32; G06F 17/30277; G06F 17/30958; H04L 1/244; H04L 5/0067; H04L 12/2415; H04L 12/2455; H04L 12/2456; H04L 12/2457; H04L 12/2458; H04L 12/26; H04L 12/2621; H04L 12/2631; H04L 12/2679; H04L 29/08009; H04L 29/08081; H04L 29/0899; H04L 41/22; H04L 43/045; H04L 43/50; H04L 67/36; H04L 69/32

USPC ........................................................ 709/224
See application file for complete search history.

(56) References Cited

U.S. PATENT DOCUMENTS

| 5,333,135 | A | 7/1994 | Wendorf |
| 5,477,531 | A | 12/1995 | McKee |
| 5,583,792 | A | 12/1996 | Li |
| 5,671,351 | A | 9/1997 | Wild |
| 5,761,486 | A | 6/1998 | Watanabe |

(Continued)

FOREIGN PATENT DOCUMENTS

EP 1 583 279 10/2005

OTHER PUBLICATIONS

U.S. Appl. No. 10/776,413, filed Feb. 11, 2004, Mlinarsky.

(Continued)

*Primary Examiner* — Melvin H Pollack
(74) *Attorney, Agent, or Firm* — SoCal IP Law Group LLP; Mark A. Goldstein (57) ABSTRACT

Combining lower layer network tests and upper layer network tests is disclosed. A method includes receiving a user selection to create an upper layer test and a lower layer test, receiving upper layer test information and lower layer test information, displaying a first timeline showing the activity of the upper layer test in a first pane and a second timeline showing the activity of the lower layer test in a second pane. Synchronization between the lower layer tests and upper layer tests may be defined. The method allows for observing and ascertaining the impact of the lower layer tests on the upper layer tests. The method may be implemented in software, stored on a storage medium and performed on a network testing system that includes one or more network cards and in one or more network testing systems.

18 Claims, 5 Drawing Sheets

(56) References Cited

U.S. PATENT DOCUMENTS

| | | | |
|---|---|---|---|
| 5,850,386 A | 12/1998 | Anderson et al. | |
| 5,854,889 A | 12/1998 | Liese | |
| 5,878,420 A | 3/1999 | de la Salle | |
| 5,974,457 A | 10/1999 | Waclawsky | |
| 6,091,802 A | 7/2000 | Smith et al. | |
| 6,108,800 A | 8/2000 | Asawa | |
| 6,279,124 B1 | 8/2001 | Brouwer et al. | |
| 6,295,557 B1 | 9/2001 | Foss | |
| 6,321,264 B1 | 11/2001 | Fletcher | |
| 6,360,332 B1 | 3/2002 | Weinberg | |
| 6,363,056 B1 | 3/2002 | Beigi et al. | |
| 6,397,359 B1 | 5/2002 | Chandra et al. | |
| 6,430,617 B1 | 8/2002 | Britt | |
| 6,473,794 B1* | 10/2002 | Guheen et al. | 709/223 |
| 6,560,648 B1* | 5/2003 | Dunn et al. | 709/224 |
| 6,640,249 B1* | 10/2003 | Bowman-Amuah | 709/228 |
| 6,664,978 B1* | 12/2003 | Kekic et al. | 715/733 |
| 6,717,917 B1 | 4/2004 | Weissberger et al. | |
| 6,724,730 B1 | 4/2004 | Mlinarsky | |
| 6,788,315 B1* | 9/2004 | Kekic et al. | 715/733 |
| 6,873,600 B1* | 3/2005 | Duffield et al. | 370/252 |
| 6,912,717 B2* | 6/2005 | Miller et al. | 719/316 |
| 6,954,789 B2 | 10/2005 | Dietz et al. | |
| 6,957,186 B1* | 10/2005 | Guheen et al. | 705/323 |
| 6,970,560 B1* | 11/2005 | Hench et al. | 379/417 |
| 6,993,578 B1* | 1/2006 | Dmitroca | 709/224 |
| 7,075,893 B1 | 7/2006 | Mlinarsky | |
| 7,099,438 B2 | 8/2006 | Rancu et al. | |
| 7,123,616 B2 | 10/2006 | Weissberger et al. | |
| 7,181,383 B1* | 2/2007 | McGaughy et al. | 703/14 |
| 7,295,555 B2 | 11/2007 | Elzur | |
| 7,327,686 B2 | 2/2008 | Standridge | |
| 7,409,328 B1* | 8/2008 | McGaughy et al. | 703/14 |
| 7,447,622 B2 | 11/2008 | Arama | |
| 7,453,885 B2* | 11/2008 | Rogers | 370/395.4 |
| 7,492,720 B2* | 2/2009 | Pruthi et al. | 370/252 |
| 7,508,769 B1* | 3/2009 | Duffield et al. | 370/252 |
| 7,515,585 B2* | 4/2009 | Rittmeyer et al. | 370/389 |
| 7,526,478 B2* | 4/2009 | Friedman | 1/1 |
| 7,536,455 B2* | 5/2009 | Duffield et al. | 709/223 |
| 7,607,169 B1* | 10/2009 | Njemanze et al. | 726/22 |
| 7,657,623 B2* | 2/2010 | Chisholm | 709/224 |
| 7,676,287 B2* | 3/2010 | Eryurek et al. | 700/83 |
| 7,739,605 B2* | 6/2010 | Plotkin et al. | 715/736 |
| 7,765,093 B2* | 7/2010 | Li et al. | 703/13 |
| 7,869,367 B2 | 1/2011 | Albrecht et al. | |
| 7,885,803 B2* | 2/2011 | Nuzman et al. | 703/21 |
| 7,944,844 B2* | 5/2011 | Ee et al. | 370/248 |
| 7,992,040 B2* | 8/2011 | Agarwal et al. | 714/26 |
| 8,028,055 B2* | 9/2011 | Duffield et al. | 709/223 |
| 8,031,627 B2* | 10/2011 | Ee et al. | 370/252 |
| 8,041,810 B2* | 10/2011 | Yang et al. | 709/224 |
| 8,051,163 B2* | 11/2011 | Ruiz et al. | 709/224 |
| 8,125,897 B2* | 2/2012 | Ray et al. | 370/229 |
| 8,144,150 B2* | 3/2012 | Gilbert et al. | 345/440 |
| 8,145,450 B2 | 3/2012 | Brown et al. | |
| 8,149,730 B1 | 4/2012 | Aybay et al. | |
| 2002/0198985 A1* | 12/2002 | Fraenkel et al. | 709/224 |
| 2003/0009544 A1 | 1/2003 | Wach | |
| 2003/0231741 A1 | 12/2003 | Rancu et al. | |
| 2004/0236866 A1 | 11/2004 | Dugatkin et al. | |
| 2005/0193258 A1 | 9/2005 | Sutton | |
| 2005/0226249 A1* | 10/2005 | Moore | 370/395.21 |
| 2006/0229018 A1 | 10/2006 | Mlinarsky | |
| 2006/0262729 A1 | 11/2006 | Chau et al. | |
| 2007/0179641 A1* | 8/2007 | Lucas et al. | 700/83 |
| 2009/0073985 A1* | 3/2009 | Rogers | 370/395.4 |
| 2009/0187654 A1* | 7/2009 | Raja et al. | 709/224 |
| 2010/0064039 A9* | 3/2010 | Ginter et al. | 709/224 |

OTHER PUBLICATIONS

Ixia Communications Inc., IxExplorer User's Guide, Revision 2.1.0, Nov. 1, 1999, pp. 1-384.

Ixia Communications Inc., The Ixia 200 Traffic Generator and Analyzer, Product Description, pp. 1-2.

Ixia Communications Inc., Ixia 200 Chassis, Product Description p. 1.

Li S-Q, et al., SMAQ: A Measurment-Based Tool for Traffic Modeling and Queuing Analysis Part I, IEEE Communications Magazine, Aug. 1, 1998.

Li S-Q, et al., SMAQ: A Measurment-Based Tool for Traffic Modeling and Queuing Analysis Part II, IEEE Communications Magazine, Aug. 1, 1998.

* cited by examiner

REAL WORLD NETWORK TESTING COMBINING LOWER LAYER NETWORK TESTS, APPLICATION LAYER TESTS AND INTERDEPENDENT INTERACTIONS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND

1. Field

This disclosure relates to network communications, network device testing, network testing, and network traffic analysis.

2. Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate how well a network device or network segment responds to lower layer anomalies, responds to upper layer anomalies, and handles streaming media and voice communications. Specifically, a network testing system may allow a user to choose to simulate one or multiple network users, one or multiple network devices, and one or multiple entities defined by the Session Initiation Protocol (SIP) to evaluate error recovery, to simulate real-world network traffic, to simulate real-world VoIP traffic, to assess conformance with SIP standards, and/or to assess conformance with network communications standards.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits, this is particularly so with regard to FIGS. 3, 4, and 5.

DETAILED DESCRIPTION

Throughout this description, the embodiments and examples shown should be considered as exemplars, rather than limitations on the apparatus and methods described.

A System

Figure 1:
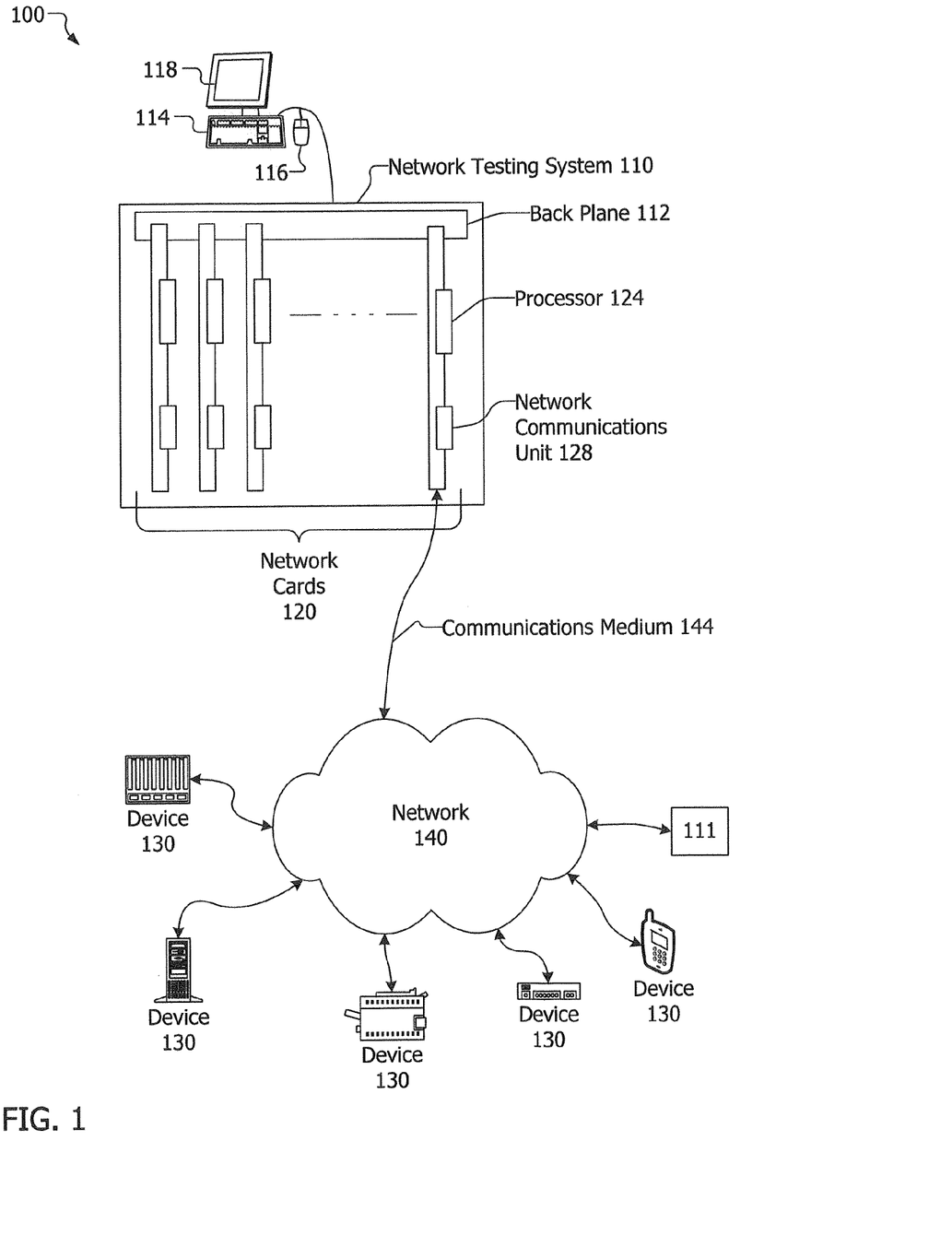
FIG. 1 is a block diagram of an environment in which lower layer network tests may be combined and performed with upper layer network tests.

FIG. 1 is a block diagram of an environment 100 in which lower layer network tests may be combined and performed with upper layer network tests. The environment 100 shows a network testing system 110 in which methods for receiving, processing and executing user authored and edited network tests including user specified synchronization of network tests may be implemented. The environment 100 includes network testing system 110 coupled via a network card 120 to a network 140 over a communications medium 144. The network testing system 110 may include or be one or more of a performance analyzer, a conformance validation system, a network analyzer, a packet blaster, a network traffic generator, a network management system, a combination of these, and/or others. The network testing system 110 may be used to evaluate or measure characteristics and performance of a network communication medium, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software. The network testing system may be used to verify the functionality of network devices and/or conformance with network communications standards.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although two connections over communications medium 144 are shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 supports multiple communications protocols. As used herein, the term "communications protocols" includes [a] higher layer communications standards or protocols, namely Open System Interconnection ("OSI") layers 4-7, including, but not limited to, one or more versions of the User Datagram Protocol (UDP), Transmission Control Protocol (TCP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), GPRS (general packet radio service) Tunneling Protocol (GTP), Real-time Transport Protocol (RTP), Real-time Transport Control Protocol (RTCP), Real-Time Streaming Protocol (RTSP), the Media Gateway Control Protocol (MEGACO), Session Description Protocol (SDP), Simple Mail Transfer Protocol (SMTP); [b] lower layer communications standards or protocols namely OSI layers 2-3, including, but not limited to, the IEEE 802.1 family of protocols, the Internet Protocol (IP), Internet Protocol Security (IPsec), the Internet Control Message Protocol (ICMP), synchronous data link control (SDLC), high-level data link control (HDLC), X.25, Point to Point Protocol (PPP), Fiber Distributed Data Interface (FDDI); and [c] physical layer standards or protocols as well as protocols that may be considered to span multiple layers, including, but not limited to, the 10 and/or 40 Gigabit Ethernet standards, the Fibre Channel standards, one or more varieties of the IEEE 802 Ethernet standards, Asynchronous Transfer Mode (ATM), Integrated Services Digital Network (ISDN), token ring, frame relay, Universal Serial Bus (USB), IEEE 1394 (also known as i.link® and Firewire®). The term "communications protocols" also includes proprietary protocols and other protocols. Each network card 120 may support a single communications protocol, may support a number or combination of related protocols, may support upper layer protocols, may support lower layer protocols, may support multiple communications protocols, may provide one or more protocol stacks, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card.

The network cards 120 may include one or more processors 124 and one or more network communications units 128. In another embodiment, the network cards 120 may have no processors 124 and may include one or more network communications units 128. In the embodiment in which the network cards do not include a processor, processing may be performed by a processor on a motherboard of the network testing system 110, on another card, on the backplane or by a remote or external unit. When the network card 120 includes two or more network communications units 128, the network card 120 is in effect two or more network capable devices. That is, a network card 120 having n network communications units 128 may function as n network capable devices.

The network communications unit 128 may be implemented as one or more field programmable gate arrays (FPGAs), application specific integrated circuits (ASICs), programmable logic devices (PLDs), programmable logic arrays (PLAs), other kinds of devices, and combinations of these. The network communications unit 128 may support one or more communications protocols. The network communications unit 128 may include a network interface through which the network card 120 may transmit and/or receive communications over the network 140. The network interfaces available in the network communications unit 128 may be controlled to be either active or inactive during a test. If the network interfaces are set or otherwise forced to be inactive, then Layer 4-7 traffic will fail. This allows for different patterns of failures to be generated. The patterns may be based on the changing status of the network interfaces. For example, the active status of the network interfaces may be brought up and down or flipped. The interface may be brought down to simulate a power shutdown, a network failure or other physical interruptions. The interface may be brought up to simulate users coming up and endpoints coming up. The interfaces may be brought up and/or down at different points in time in a variety of patterns to simulate a variety of situations.

The network card 120 may include and/or have access to local and/or remote memory, storage media and storage devices. Instructions to be executed by the processor on the network card and/or by the network testing system may be stored on and executed from a local or remote machine readable medium or storage device. A machine readable medium includes, for example, without limitation, magnetic media (e.g., hard disks, tape, floppy disks), optical media (e.g., CD, DVD, Blu-ray disc), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, solid-state drives (SSDs), DVD drives, flash memory devices, and others.

The processor 124, network communications unit 128, and memory may be included in one or more FPGAs, PLAs, and/or PLDs on the network card 120. Additional and fewer units, hardware and firmware may be included in the network card 120.

The back plane 112 may serve as a bus or communications medium for the network cards 120. The back plane 112 may support Ethernet or other communications protocols. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens, tablets and trackballs. The user input devices may be coupled to a network card, other card, motherboard, or backplane included in the chassis.

The network testing system 110 may be implemented in a computer such as a personal computer, server, or workstation, as well as in the chassis shown. The network testing system 110 may be used alone or in conjunction with one or more other network testing systems 111. The network testing system 110 may be located physically adjacent to and/or remote to the network capable devices 130 in the network 140. The network testing system 110 may be used to test and evaluate the network 140 and/or portions thereof, network capable devices 130, applications running on network capable devices 130, and/or services provided by network 140 and/or network capable devices 130 and/or network applications that run on network capable devices 130. The network testing system 110, the network cards 120, and the network communications units 128 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for data units to travel. Each node may be a network capable device as described below. A node may be a computing device, a data communications device, a network capable device, a network card, or other devices as defined and described herein.

Communications on the network 140 may take various forms, including frames, cells, datagrams, packets, messages, higher level logical groupings, or other units of information, all of which are referred to herein as data units. Those data units that are communicated over a network are referred to herein as network traffic. The network traffic may include data units that represent electronic mail messages, streaming media such as music (audio) and video, telephone (voice) conversations, web pages, graphics, documents, and others. Communications on the network 140 conform to one of the communications protocols described above.

The network capable devices 130 may be devices capable of communicating over the network 140 and/or listening to, injecting, delaying, dropping, relaying, processing, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, network testing systems and network traffic generators; components such as processors, network cards and network communications units; and networking devices such as routers, relays, firewalls, hubs, switches, bridges, traffic accelerators, and multiplexers. In addition, the network capable devices 130 may include home appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The network testing system 110 may send communications over the network 140 to a or through a network capable device 130. The destination of communications sent by the network testing system 110 may be a device under test such as a network capable device 130, may be a system under test, may be the network testing system 110, and may be a second network testing system 111. The network testing system 111 may be similar to or the same as network testing system 110. A first network card 120 in the network testing system 110 may send communications over the network 140 to a or through a network capable device 130 that are received by a second network card 120 in the network testing system 110 or are received by a third network card in the network testing system 111. The network testing system 110 may listen to and/or capture communications on the network 140.

The Methods

The methods described herein may be implemented in various environments, such as environment 100 shown in FIG. 1. Referring to FIG. 1, to perform various tests, network testing software running on the network testing system 110 may send data units from a first network card 120 to a second network on the network testing system 110 card through an intermediary network communications device such as a switch, a firewall, a Session Border Controller (SBC), a gateway, an Application Layer Gateway (ALG), a router such as, for example, a Network Address Translation (NAT) router, an intermediary server or other network capable device 130 over network 140.

As shown in FIG. 1, to perform various tests, network testing software running on the first network testing system 110 may send data units to a second network testing system 111 through an intermediary network communications device 130 such as a router, gateway, switch, intermediary server or other network communications device over network 140.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a blade or other card with a processor in the network testing system. The network testing software may be stored on a volatile or nonvolatile memory device or storage medium included in or on and/or coupled with a computing device, a network testing system, a network card, or other card. The methods may be implemented on one or more network cards 120 in a single network testing system or may be implemented on one or more network cards 120 on each of and between two network testing systems 110 and 111, and may be implemented on one or more network cards 120 on each of and among three or more network testing systems 110 and 111.

Figure 2:
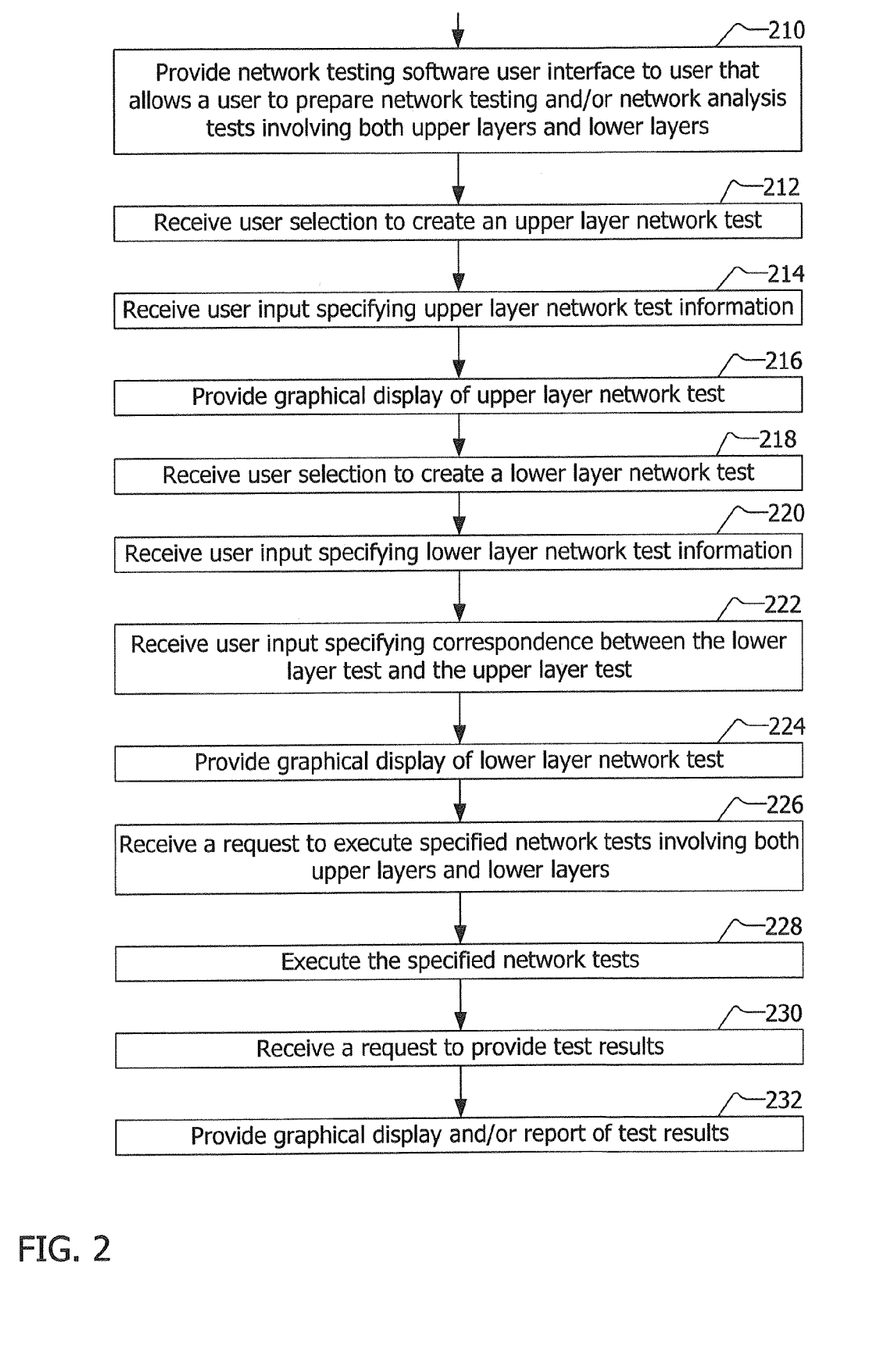
FIG. 2 is a flow chart of actions taken in which lower layer network tests may be combined and performed with upper layer network tests.
Figure 3:
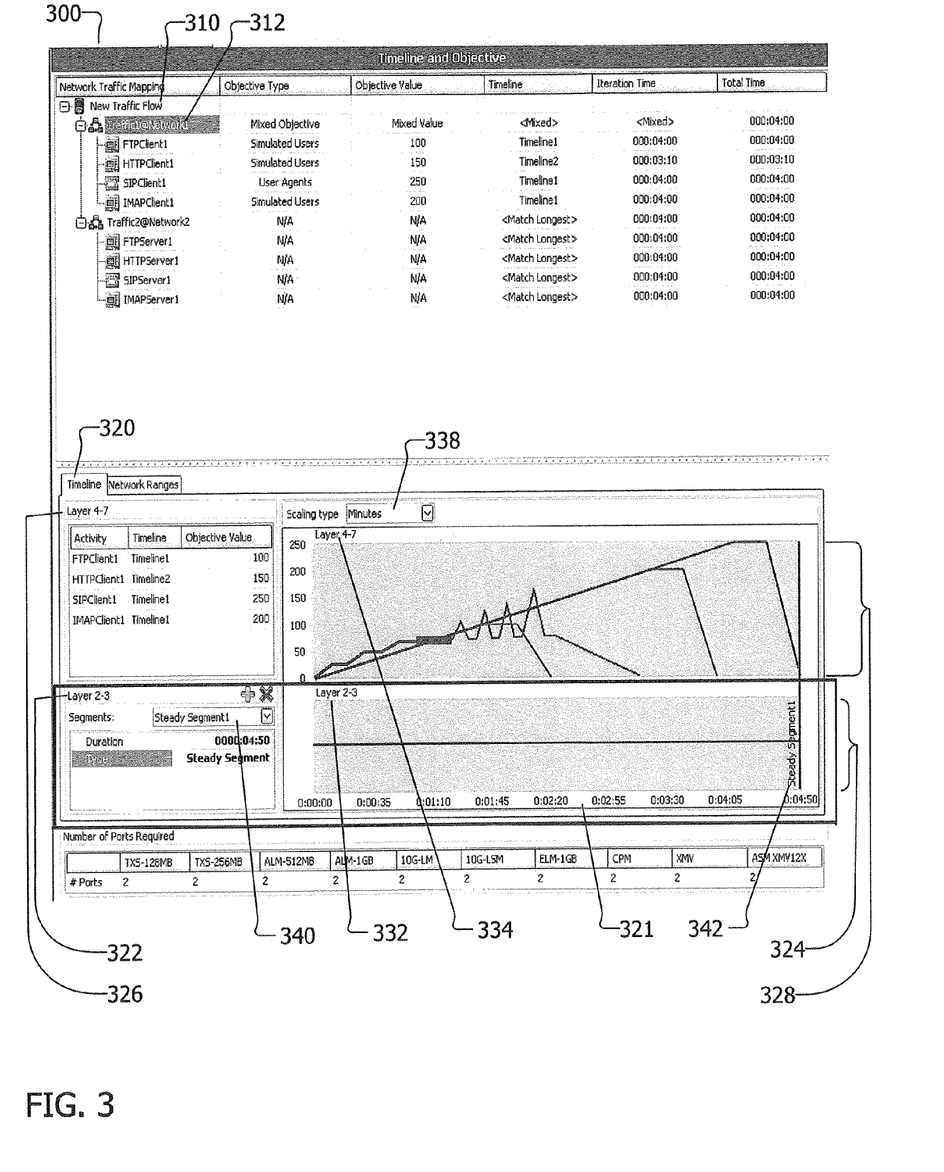
FIG. 3 is a first screen shot of a network testing software user interface in which lower layer network tests may be combined and performed with upper layer network tests.
Figure 4:
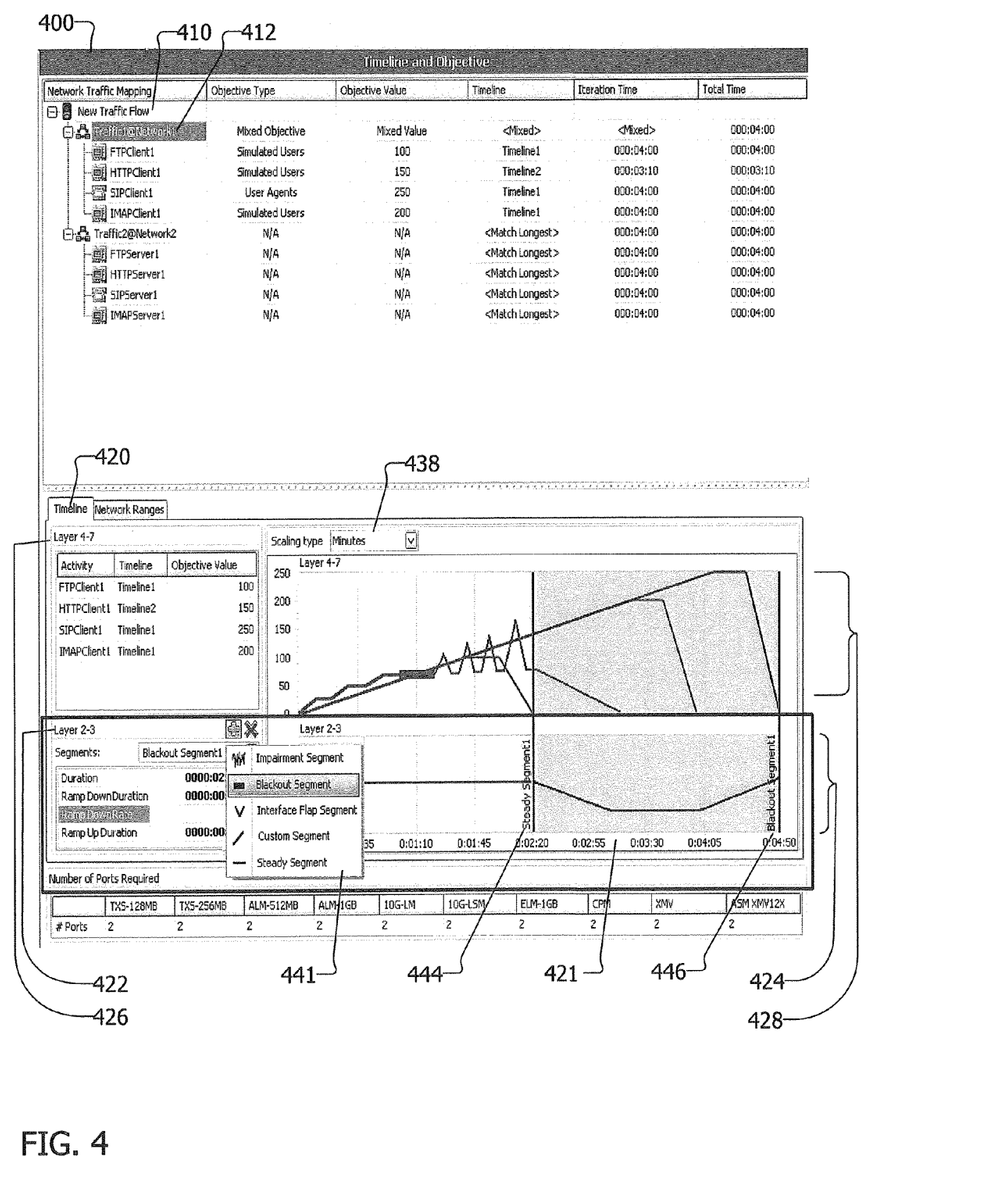
FIG. 4 is a second screen shot of a network testing software user interface in which lower layer network tests may be combined and performed with upper layer network tests.
Figure 5:
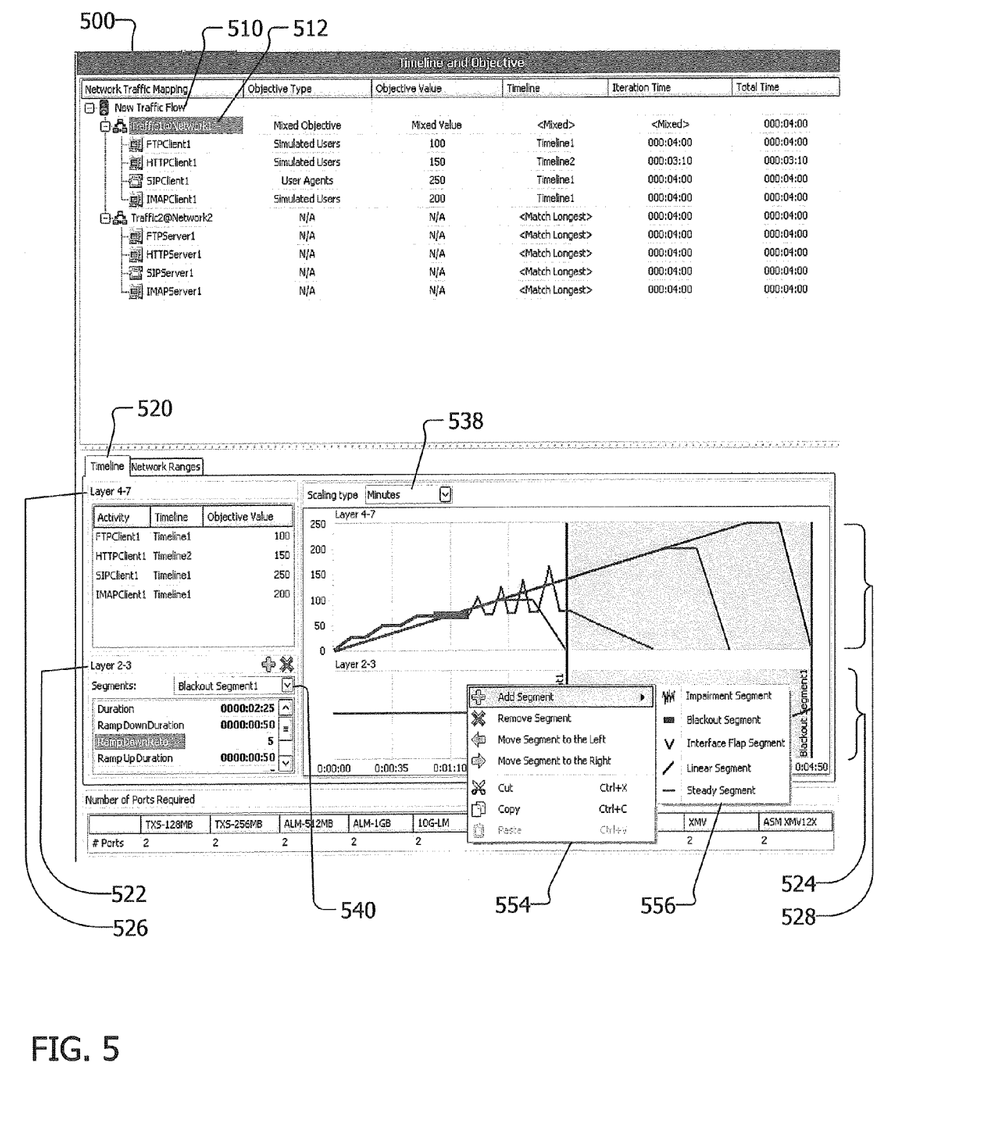
FIG. 5 is a third screen shot of a network testing software user interface in which lower layer network tests may be combined and performed with upper layer network tests.

FIG. 2 is a flow chart of actions taken in which lower layer network tests may be combined and performed with upper layer network tests. The actions described may be performed by network testing software or other software executing on a network testing system or other computing device. The network testing software provides a network testing software user interface to users that allows a user to prepare network testing and/or network analysis tests involving both upper layer and lower layer communications standards, as shown in block 210. The user interface may use a variety of user interface elements, including, but not limited to, windows, panes, frames, buttons, sliders, menus, text entry fields, radio buttons, check boxes, etc. The user interface referenced in block 210 may be the user interface depicted in FIGS. 3, 4 and 5. FIGS. 3, 4 and 5 are discussed in more detail below.

The network testing software on a network testing system provides a user interface to receive network tests specified by a user. The network tests may include sending or transmitting, receiving and capturing network traffic that conform to one or more network communications protocols. Network tests may also send network traffic that is nonconforming, that is that does not conform to communications protocols, to evaluate how a network device, network segment, and/or network application (also known as devices, systems, or networks under test) handles the nonconforming network traffic. Lower layer tests may allow a user to introduce lower layer anomalies into devices, systems, or networks under test to evaluate how the devices, systems, or networks under test react or recover.

For testing and evaluating a network, network devices or network applications, the network testing software may emulate one or more clients, callers, or senders, or a cloud composed from different entities. The network testing software may also generate negative or nonconforming traffic to test application or device conformance with the network communications standards.

Referring again to FIG. 2, a user selection to create an upper layer network test is received, as shown in block 212. User input providing information about the upper layer network test is received, as shown in block 214. The network testing system provides a graphical display of the upper layer network test, as shown in block 216. The graphical display may be a timeline shown in FIGS. 3, 4 and 5 as elements 328, 428 and 528.

A user selection to create a lower layer network test is received, as shown in block 218. User input providing information about the lower layer network test is received, as shown in block 220. User input specifying a correspondence between the lower layer network test and the upper layer network test is received, as shown in block 222. The correspondence may be defined by the specification of start time and/or completion time of lower layer tests so that they occur at a desired time in relation to the start, completion or ongoing processing of an upper layer test. The correspondence may be defined by the specification of start time and/or completion time of upper layer tests so that they occur at a desired time in relation to the start, completion or ongoing processing of a lower layer test. The information used to define the correspondence may be referred to as synchronization information. The correspondence may be shown by the network testing system displaying timelines representing the upper layer tests and lower layer tests on a graphical user interface that includes a time scale as shown and/or described herein regarding elements 321 and 421 of FIGS. 3, 4 and 5.

The correspondence may be achieved by the user placing and/or moving a timeline representing an upper layer and/or a lower layer test to a certain desired location on a graphical user interface that includes a time scale as shown and described herein regarding elements 321 and 421 of FIGS. 3 and 4. The user may add multiple segments to the timeline. The user may remove, insert and edit these timeline segments. The timeline segments control different actions on user specified upper layer and/or a lower layer behavior. The correspondence between the lower layer network test and the upper layer network test may be specified in timeline segments.

The network testing system provides a graphical display of the lower layer network test, as shown in block 224. The graphical display may be a timeline shown in FIGS. 3, 4 and 5 as elements 324, 424 and 524.

In other embodiments, the network testing system may perform the actions described in blocks 212-224 in an order different than as shown. For example, the lower layer tests may be received before the upper layer tests, and the receipt of some upper and lower layer tests may be interspersed with one another. And steps 212-224 may be combined or further refined to achieve the methods described herein. For example, the graphical user interface, namely the timelines, may be the primary user interface provided to the user such that the upper layer and lower test information, including the synchronization information that defines a correspondence between the upper layer and lower layer tests, is derived by the network testing system from the user placement of lower layer and/or upper layer timelines via the graphical user interface shown in FIGS. 3, 4 and 5.

A user request to execute specified network tests involving both upper layers and lower layers is received, as shown in block 226. The specified network tests are then executed, as shown in block 228. The network testing system graphically shows the impact of the lower layer network test on the upper layer network test. That is, in real time, or after a relatively short delay such as a few seconds or less or as much as minute, as the lower layer network test and upper layer network test are executing, the network testing system graphically shows the impact of layer 2-3 operations, constraints and anomalies on the functioning of layers 4-7 and, in particular, the upper layer tests. The operations, constraints and anomalies of the lower layers may reflect real world network traffic lower layer occurrences so that impact on the real world network traffic in the upper layers may be evaluated by this testing technique. The network testing system graphically shows the impact of the lower layer network test on the upper layer network test in a lower layer pane and an upper layer pane and related timelines described below regarding and shown in FIGS. 3, 4 and 5. In this way the interdependence of interactions between the lower layer network tests and/or functioning and the upper layer network tests and/or functioning may be tested, evaluated and seen.

A user request to provide test results may be received, as shown in block 230. A graphical display, report or other form of test results may be provided to the user, as shown in block 232. The test results may include data or graphical information that allows a user to understand or view the impact of lower layer tests on the functioning of the upper layers and in particular on the functioning of the upper layer tests. The test results may be provided in a file, such as fore example, a portable document format (PDF) file, a text file, a graphics file, a spreadsheet file that includes text, data, graphs and/or other representations of the results of the tests.

The pertinent data and instructions involving the upper layer network tests and lower layer network tests may be received via a user interface using typical user interface elements including, but not limited to, windows, panes, frames, buttons, sliders, menus, text entry fields, radio buttons, check boxes, etc. FIGS. 3, 4 and 5 show an example embodiment of a user interface that receives network test specifications, graphically shows the tests and the network or networks in which they run on a time scale, graphically shows real-time activity of the tests and the network or networks in which they run, and graphically and/or in table or format or using other techniques provides the results of the network tests.

Specifically, FIG. 3 is a first screen shot of a network testing software user interface in which lower layer network tests may be combined and performed with upper layer network tests. The user interface may provide a main window 300 having a top portion and a bottom portion. The top portion may contain information about the upper layer network specified in an upper layer network test. The upper layer network test may be specified as a traffic flow 310. The traffic flow may include one or more networks 312 over which network traffic is to be produced. The upper layer network test may be wholly user specified, may be user customized based on a template, or may an unaltered, pre-populated system provided template.

The bottom portion of the main window 300 may be a network timeline 320 sub-window or pane. The network timeline 320 sub-window may include a lower layer pane 332, displaying lower layer test information 322, and displaying a lower layer test timeline 324. The network timeline 320 sub-window may include an upper layer pane 334 displaying upper layer test information 326, and displaying an upper layer test timeline 328. The timelines 324 and 328 are two-dimensional line graphs that proceed from left to right. The timelines 324 and 328 are shown with respect to a time scale 338.

The timelines 324 and 328 are shown on the same scale so that the system visually provides a graphical representation of the network traffic activity of the upper layer and the lower layers in correspondence with one another, namely with respect to the same time scale 338. This allows a user to readily perceive the correspondence of tests or other happenings resulting from both the upper layer tests and the lower layer tests. This allows a user to readily perceive the activities of both the upper layer tests and the lower layer tests with respect to one another at the same moment in time. That is, the system allows a user to better perceive the interactions of occurrences happening concurrently at both the upper layers and lower layers. Similarly, the timeline allows a user to more easily synchronize the happenings of lower layer test with upper layer test. That is, the timeline allows a user to readily synchronize lower layer tests with upper layer tests. This is achieved by the user specifying a correspondence as described above.

The time scale 338 that may be user selectable as minutes, seconds, hours, fit to image, and auto. The "fit to image" scale may automatically set a scale so that the entire timelines for the tests are depicted. The auto scale may be a system defined default, such as the first 5 minutes shown in minutes and then displayed accordingly. In one embodiment, the auto scale is user defined to match the most often user preferred scale settings. The selection of the scale 338 may be provided as a drop down menu or via other user interface construct. The resulting scale may be depicted numerically (shown as element 321) toward the bottom of the lower layer pane 332.

The vertical Y axis shown in pane 328 refers to the target objective value for the test. The same is true of the vertical Y axes shown in panes 428 and 528. Target objective values can represent, for example, a number of users, a number of concurrent connections, a number of concurrent sessions, the transactions per second, the connections per second, the kilobytes throughput per second, and/or the megabytes throughput per second. The target objective values may be system defined, user selectable, user definable, and may relate to or be based on the particular test.

The vertical Y axis shown in pane 324 refers to the number of network interfaces in the lower layer network test. The same is true of the vertical Y axes shown in panes 424 and 524.

A user may choose to add lower layer segments; the lower layer segments may be characterized as lower level operations or lower level constraints. The user specified lower layer segments are displayed in the lower layer timeline 324. When a user selects to add a lower layer segment, the default may be a steady segment 342 shown by the straight horizontal line in 324. A steady segment is a segment that allows for normal functionality of the lower layers. Other kinds of segments are described below. A newly added segment may be configured by the user by specifying various parameters for the segment using the fields and other user interface elements on the left hand side 322 of the network timeline 320 sub-window.

FIG. 4 is a second screen shot of a network testing software user interface in which lower layer network tests may be combined and performed with upper layer network tests.

The user interface allows the user the ability to select from the multiple supported kinds of segments by a pull down menu 340/441. Other user interface elements may be used. The user may be provided the option of selecting from an impairment segment, a blackout segment, an interface flap segment, a steady segment, and a custom segment as shown in menu 441. The user may add one or more lower layer timeline segments. The term segment is used to signify a segment or portion of time during which the lower layer test will be applied. The segments are performed or executed in time order as specified by the user via the user interface. The lower layer timeline 424 shown in FIG. 4 displays a steady segment 444 followed by a blackout segment 446, whose constructs are explained below.

The lower layer tests allow a user to specify lower layer anomalies. The lower layer tests allow the user to evaluate how the upper layers perform in view of the lower layer anomalies. The lower layer tests also allow the user to evaluate how devices, systems, or networks under test react to or recover from the lower layer anomalies specified in the lower layer test. In one embodiment, the system provides the user the ability to select from system provided lower layer tests, including, for example, impairment segments, interface flap segments, linear segments, and steady segments as well as user specified custom segments. These segments, after they are selected or specified by a user, are displayed graphically as the lower layer timeline 424. Descriptions of each of these lower layer test segments follow.

The "impairment segment" allows a user to specify a user defined or a system pre-defined impairment profile that will be active for a user specified duration. The duration may be entered by a user by typing into a text box or may be selectable from a pull-down menu or other user interface construct. In one embodiment, the duration may be no shorter than one second. Other minimum durations may be specified. The impairment profile may be selected from a drop-down menu or other user interface construct that provides a list of already created impairment profiles and provides the option to create a new impairment profile. The Impairment profile refers to the pattern used to impair network traffic. Kinds of impairments include delaying, dropping, reordering, duplicating, fragmenting, limiting inbound and/or outbound network traffic. The system provides the user the ability to associate an impairment profile as a segment in the timeline.

The "interface flap segment" provides the user the ability to bring down and up network interfaces at a specified rate for a certain number of times. The "interface flap segment" may be specified according to the following parameters.

a. "Total Duration": The total number of seconds or minutes the flapping activity will execute. A system defined minimum total duration may be set, such as 3 seconds, 5 seconds, 10 seconds, etc.

b. "End Interface Count": The total number of interfaces that will be up (aka alive) at the end of the execution of the segment.

c. "Interface Teardown Type": The type of interface tear down may be specified as graceful or forceful. The type may be specified by a pull-down menu, by radio buttons, or other user interface construct. An interface is torn down gracefully when the cessation of the interface is achieved according to with a particular applicable communications protocol. A graceful shutdown simulates the case when a user/application initiates termination of the interface. In a graceful shutdown, layer 2-3 protocol termination process are initiated to signal the peer to bring down the interface according to a particular layer 2-3 protocol. An interface is torn down forcefully when the cessation of the interface is achieved in disregard of or in nonconformance with a particular communications protocol. A forceful teardown simulates a physical shutdown in which the interface is no longer able to send or receive packets. In a forceful shutdown, layer 2-3 protocols are not provided an opportunity to send termination packets or respond to error recovery attempts initiated by the peer according to a particular layer 2-3 protocol.

d. "Repetitions": This parameter indicates the number of times the specified interfaces will be flapped using the specified ramp-up and ramp-down parameters.

e. "Interface Percentage Drop": This parameter indicates the percentage of interfaces that will be dropped and brought back up at the end of each flap.

f. "Interface Ramp Down Duration": This parameter specifies the duration at the end of which the Interface Percentage Drop is achieved. The value may be set no lower than a system specified minimum, such as, for example, 1 second.

g. "Interface Ramp Up Duration": This parameter specifies the duration at the end of which the interfaces that were brought down are brought up. The value may be set no lower than a system specified minimum, such as, for example, 1 second.

For example, if the user has specified a percentage drop of 10, and if there are 100 interfaces, 1 out of every 10 interfaces is torn down. If the Interface ramp-down duration is 10 seconds, one interface is torn down every second.

In another example, if the total number of interfaces is 100 and the percentage drop is 10, and the ramp-down duration is 2 seconds, for each second, 5 interfaces would be brought down.

The parameters for this segment may be provided in text fields, by pull-down menus and/or by other user interface constructs. The parameters may be pre-populated with commonly used values that may be system set or user set.

The "linear segment" allows a user to specify that certain interfaces be brought down or up according to a user specified End Interface Percentage. Interfaces will be either brought down or up in a linear fashion based on the current alive interface count and the desired End Interface Percentage. With this segment, the specified interfaces will be brought up when the ratio of the current alive interface count to the total number of interfaces is less than the End Interface Percentage. With this segment, the specified interfaces will be brought down when the ratio of the current alive interface count to the total number of interfaces is greater than the End Interface Percentage. The following parameters may be set to specify this segment.

a. "Duration": The parameter specifies in second or minutes how long the segment should execute.

b. "End Interface Percentage": The parameter is used to specify the desired percentage of the total number of interfaces to be alive at the end of performance of the segment.

c. "Interface Teardown Type": This value allows a user to specify whether the teardown should be graceful or forceful. In one embodiment, the default Interface Teardown Type is graceful.

d. "End Interface Count": This parameter is a read-only value indicating the total number of interfaces to be up (alive) at the completion of the segment. This value is read-only as it is computed by applying the end interface percentage on the network interface count at the beginning of the segment.

A "steady segment" allows the user to specify a duration during which the interfaces remain up (alive) and functioning.

The user is allowed to add, remove, and modify a segment in a lower layer network timeline. This is shown in FIG. 5 which is a third screen shot of a network testing software user interface in which lower layer network tests may be combined and performed with upper layer network tests. A selected segment may be removed by a user selecting the "X" above the pull-down menu 540. A new segment may be added by a user selecting the "+" above the pull-down menu 540. Alternatively and/or additionally, the user may right-click on the network timeline to add a network segment, move a network segment, remove a network segment and to modify the network segment. When a user right clicks on a lower layer timeline, a menu 554 may be provided to allow the user to perform the actions recited in the prior sentence. In addition, other actions may be supported, such as cut, copy and pasting of a network timeline segment.

When the "add segment" option is selected in menu 544 by a user, the system may provide a walk-out menu 556 that allows a user to select the type of segment to be added, as describe above, for example, an impairment segment, a blackout segment, an interface flap segment, and a steady segment.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method of creating network tests on a network testing system including multiple network cards, each network card having at least one processor and at least one network communications unit, the method comprising:

the network testing system providing a graphical user interface to a user, the graphical user interface including a first pane and a second pane the network testing system receiving a user selection to create an upper layer test involving at least one of layers 4-7 of the Open Systems Interconnection model the network testing system receiving upper layer test information from the user the network testing system executing the upper layer test according to the upper layer test information the network testing system displaying in the first pane a first graph including at least one first timeline showing upper layer test activity the network testing system receiving a user selection to create a lower layer test involving at least one of layers 2-3 of the Open Systems Interconnection model the network testing system receiving lower layer test information from the user, the lower layer test information including synchronization information specifying a correspondence with the upper layer test the network testing system executing the lower layer test according to the lower layer test information the network testing system displaying in the second pane a second graph including a second timeline showing lower layer test activity, wherein the first time line and the second time line are displayed having the same time scale the network testing system graphically showing the impact of the lower layer test on the upper layer test.

2. The method of claim 1 further comprising:
the network testing system providing test results to the user, the test results including data and/or graphical information showing the impact of the lower layer test on the functioning of the upper layer test.

3. The method of claim 1 further comprising:
the network testing system providing the user a selection of a plurality of lower layer network tests.

4. The method of claim 3 wherein the plurality of lower layer network tests includes at least one of or a combination of an impairment segment, a blackout segment, an interface flap segment, a steady segment, and a custom segment.

5. The method of claim 1 wherein the first graph and the second graph are displayed horizontally adjacent to one another.

6. The method of claim 1 wherein the first graph includes a first Y axis that represents one of a number of users, a number of concurrent connections, a number of concurrent sessions, a number of transactions per second, a number of connections per second, a number of kilobytes throughput per second, and a number of megabytes throughput per second and wherein the second graph includes a second Y axis that represents a number of network interfaces in the lower layer network test.

7. A network testing system comprising:
a processor coupled to a bus
a plurality of network cards coupled to the bus
a display
a storage medium having instructions stored thereon which when executed by the
network testing system cause the network testing system to perform actions comprising:
providing a graphical user interface to a user via the display, the graphical user interface including a first pane and a second pane
receiving a user selection to create an upper layer test involving at least one of layers 4-7 of the Open Systems Interconnection model
receiving upper layer test information from the user
executing the upper layer test according to the upper layer test information
displaying in the first pane a first graph including at least one first timeline showing upper layer test activity
receiving a user selection to create a lower layer test involving at least one of layers 2-3 of the Open Systems Interconnection model
receiving lower layer test information from the user, the lower layer test information including synchronization information specifying a correspondence with the upper layer test
executing the lower layer test according to the lower layer test information
displaying in the second pane a second graph including a second timeline showing lower layer test activity, wherein the first time line and the second time line are displayed having the same time scale
graphically showing the impact of the lower layer test on the upper layer test.

8. The network testing system of claim 7 wherein the storage medium has further instructions stored thereon which when executed by the network testing system cause the network testing system to perform further actions comprising:
providing test results to the user, the test results including data and/or graphical information showing the impact of the lower layer test on the functioning of the upper layer test.

9. The network testing system of claim 7 wherein the storage medium has further instructions stored thereon which when executed by the network testing system cause the network testing system to perform further actions comprising:
providing the user a selection of a plurality of lower layer tests.

10. The network testing system of claim 9 wherein the plurality of lower layer tests includes at least one of or a combination of an impairment segment, a blackout segment, an interface flap segment, a steady segment, and a custom segment.

11. The network testing system of claim 7 wherein the first graph and the second graph are displayed horizontally adjacent to one another.

12. The network testing system of claim 7 wherein the first graph includes a first Y axis that represents one of a number of users, a number of concurrent connections, a number of concurrent sessions, a number of transactions per second, a number of connections per second, a number of kilobytes throughput per second, and a number of megabytes throughput per second and wherein the second graph includes a second Y axis that represents a number of network interfaces in the lower layer network test.

13. A storage medium having instructions stored thereon which when executed by a network testing system cause the network testing system to perform operations comprising:
providing a graphical user interface to a user via a display, the graphical user interface including a first pane and a second pane
receiving a user selection to create an upper layer test involving at least one of layers 4-7 of the Open Systems Interconnection model
receiving upper layer test information from the user
executing the upper layer test according to the upper layer test information
displaying in the first pane a first graph including at least one first timeline showing upper layer test activity
receiving a user selection to create a lower layer test involving at least one of layers 2-3 of the Open Systems Interconnection model receiving lower layer test information from the user, the lower layer test information including synchronization information specifying a correspondence with the upper layer test executing the lower layer test according to the lower layer test information displaying in the second pane a second graph including a second timeline showing lower layer test activity, wherein the first time line and the second time line are displayed having the same time scale graphically showing the impact of the lower layer test on the upper layer test.

14. The storage medium of claim 13 having further instructions stored thereon which when executed by the network testing system cause the network testing system to perform further actions comprising:

providing test results to the user, the test results including data and/or graphical information showing the impact of the lower layer test on the functioning of the upper layer test.

15. The storage medium of claim 13 having further instructions stored thereon which when executed by the network testing system cause the network testing system to perform further actions comprising:

providing the user a selection of a plurality of lower layer tests.

16. The storage medium of claim 15 wherein the plurality of lower layer network tests includes at least one of or a combination of an impairment segment, a blackout segment, an interface flap segment, a steady segment, and a custom segment.

17. The storage medium of claim 13 wherein the first graph and the second graph are displayed horizontally adjacent to one another.

18. The storage medium of claim 13 wherein the first graph includes a first Y axis that represents one of a number of users, a number of concurrent connections, a number of concurrent sessions, a number of transactions per second, a number of connections per second, a number of kilobytes throughput per second, and a number of megabytes throughput per second and wherein the second graph includes a second Y axis that represents a number of network interfaces in the lower layer network test.

\* \* \* \* \*